United States Patent [19]

Hosoya

[11] 4,183,049
[45] Jan. 8, 1980

[54] TINT CONTROL SIGNAL GENERATOR FOR COLOR TELEVISION RECEIVER

[75] Inventor: Nobukazu Hosoya, Moriguchi, Japan

[73] Assignee: Sanyo Electric Co., Ltd., Osaka, Japan

[21] Appl. No.: 904,447

[22] Filed: May 9, 1978

[30] Foreign Application Priority Data

May 9, 1977 [JP] Japan .................................. 52-54523
Dec. 2, 1977 [JP] Japan ............................ 52-164134[U]

[51] Int. Cl.$^2$ ............................................. H04N 9/535
[52] U.S. Cl. ........................................ 358/28; 358/10
[58] Field of Search ..................................... 358/10, 28

[56] References Cited

U.S. PATENT DOCUMENTS

3,456,068 7/1969 Wilhelmy ................................ 358/10
3,780,218 12/1973 Rennick .................................. 358/28

Primary Examiner—Richard Murray
Attorney, Agent, or Firm—Armstrong, Nikaido, Marmelstein & Kubovcik

[57] ABSTRACT

A tint control signal generator for a color television receiver for generating a tint control signal to be applied to a tint control for adjustment of the tint of the reproduced television image by the utilization of a reference signal included in the transmitted television information only during the time of predetermined vertical intervals, which reference signal is generally known as a VIR signal. The tint control signal generator comprises a zero clamping circuit for sampling a direct current component out of an appropriate output of the color demodulator during the vertical synchronizing interval, a zero level comparator for comparing a reference voltage level with the level of the appropriate color demodulator output during the chroma reference interval of the VIR signal and for generating the tint control signal if any difference exists as a result of the comparison.

8 Claims, 9 Drawing Figures

TINT CONTROL SIGNAL GENERATOR FOR COLOR TELEVISION RECEIVER

The present invention generally relates to a color television receiver and, more particularly, to a tint control signal generating circuit for use in the color television receiver for generating a tint control signal by the utilization of a vertical interval reference (VIR) signal included in the transmitted television signal only during the time of predetermined vertical intervals.

It is well known that, during transmission of color television information from a television broadcasting station to a color television receiver, phase errors often occur resulting in deterioration of hue, color saturation and contrast of the televised image. In order to compensate for such phase error, some television broadcasting stations employ a television system within the framework of the existing television standard in which a vertical interval reference (VIR) signal is inserted in the color television information transmitted therefrom towards color television receivers. This VIR signal is, as is well known to those skilled in the art, included in the transmitted television information only during the time of predetermined vertical intervals, for example, on the 19th or 20th line of the televised image during each vertical synchronizing interval.

Figure 1:
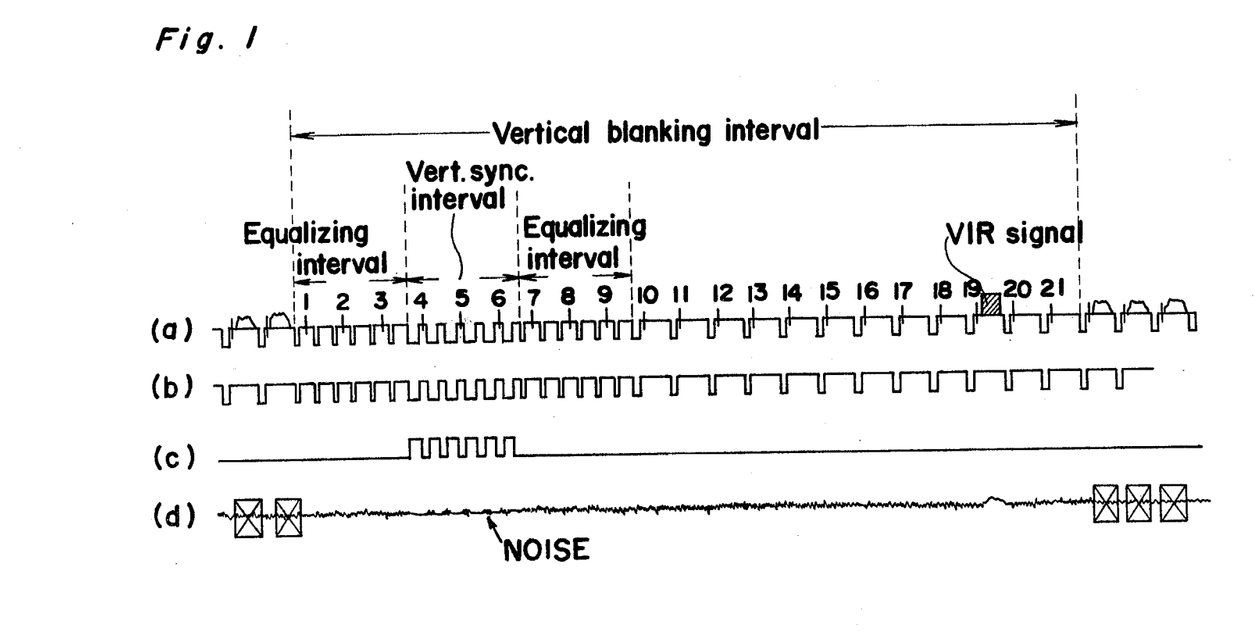
FIG. 1 is a diagram showing waveforms of various signals employed in association with a tint control signal generator of the present invention.

More specifically, with reference to FIG. 1 of the accompanying drawings, the transmitted television information including the VIR signal is shown by a waveform (a) and this VIR signal is shown as carried on the 19th line in vertical blanking or retrace interval which covers 21 lines of each field. As shown by a waveform (A) in FIG. 2, the VIR signal includes chroma reference, luminance reference and black level reference components.

Prior art color television receivers dealing with the VIR signal containing television information are disclosed, for example, in the U.S. Pat. Nos. 3,456,068, patented on July 15, 1969; 3,780,218, patented on Dec. 18, 1973; and 3,950,780, patented on Apr. 13, 1976.

In particular, the U.S. Pat. No. 3,780,218 discloses a color television receiver comprising a differential amplifier adapted to be gated on during the occurrence of the VIR signal whereby an appropriate output of the receiver demodulator, e.g., the R-Y color difference output, is compared with a suitable reference voltage and a control voltage developed if there are any phase differences between the chrominance reference information included in the VIR signal and the color burst signal controlling the output frequency of the reference oscillator.

The present invention, however, has been developed to provide an improved tint control signal generator for generating a tint control signal to be applied to a known tint control, which may be an automatic phase control, for effecting any necessary tint correction, by the utilization of the VIR signal included in the television information.

Another object of the present invention is to provide an improved tint control signal generator of the type referred to above wherein all of the components can be readily assembled into an integrated circuit.

A further object of the present invention is to provide an improved tint control signal generator of the type referred to above, wherein the required adjustment of the tint of the reproduced image can be accomplished either manually or automatically.

A still further object of the present invention is to provide an improved tint control signal generator of the type referred to above, capable of generating the tint control signal readily therefrom and effecting a correct and immediate tint adjustment even when the television receiver set is switched over from one channel, through which the television information containing no VIR signal is broadcasted, to another channel through which the television information containing the VIR signal is broadcasted.

According to the present invention, the tint control signal generator comprises a zero chroma clamping circuit for sampling a direct current component out of an appropriate output of the color demodulator, e.g., the R-Y color difference output, during the vertical synchronizing interval, a zero level comparator adapted to be operated by a trigger pulse of a duration equal to the duration of the chroma reference component of the VIR signal for comparing a reference voltage level, established by the sampled direct current component of the R-Y color difference output, with the level of the R-Y color difference output during the chroma reference interval of the VIR signal and for generating the tint control signal if any difference exists as a result of the comparison.

These and other objects and features of the present invention will become apparent from the following description taken in conjunction with preferred embodiments thereof with reference to the accompanying drawings, in which:

Before the description of the present invention proceeds, it is to be noted that like parts are designated by like reference numerals throughout the accompanying drawings for the sake of brevity.

Figure 3:
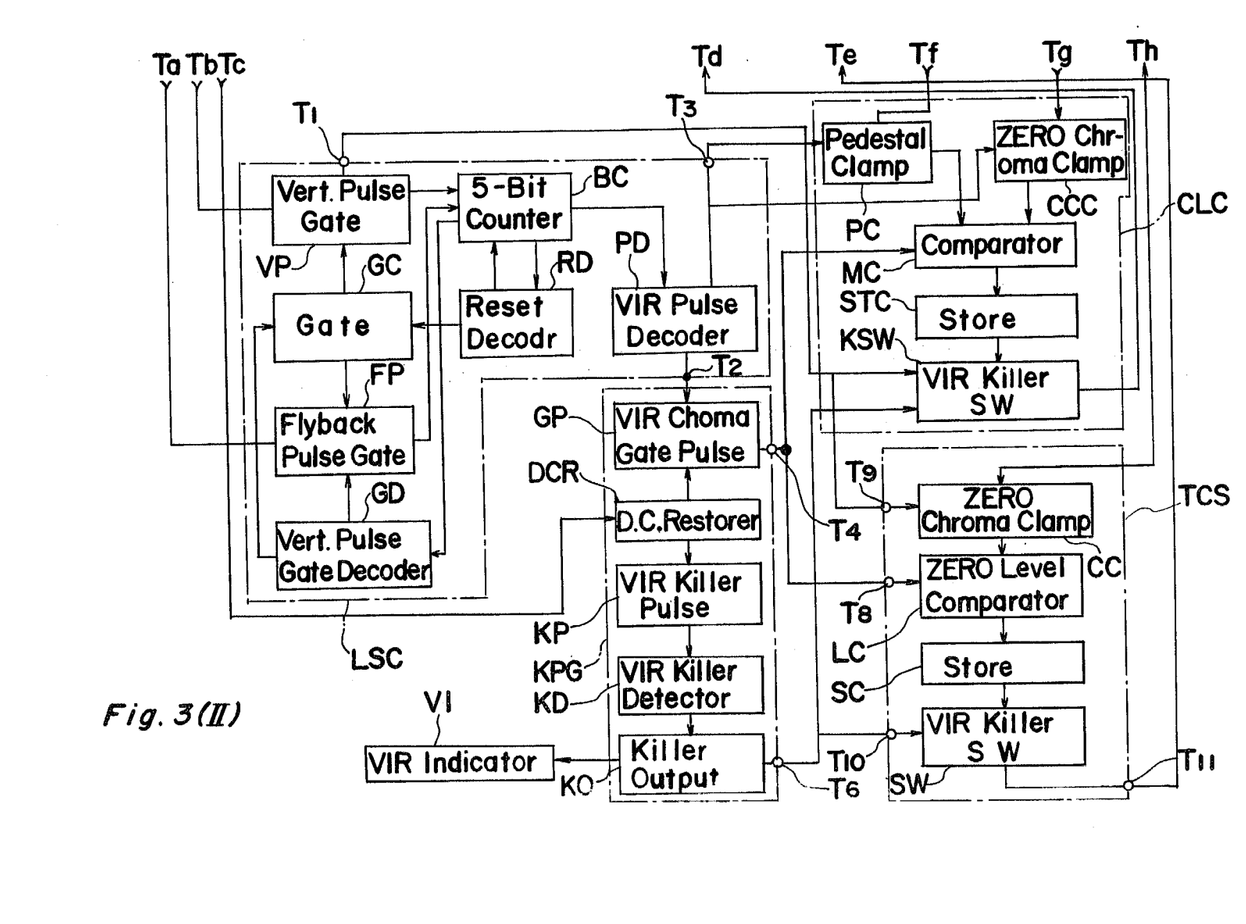
FIG. 3 is a block diagram of a color television receiver set having the tint control signal generator of the present invention, FIG. 3 being divided into two parts which are respectively designated by FIG. 3(I) and FIG. 3(II)
Figure 3I:
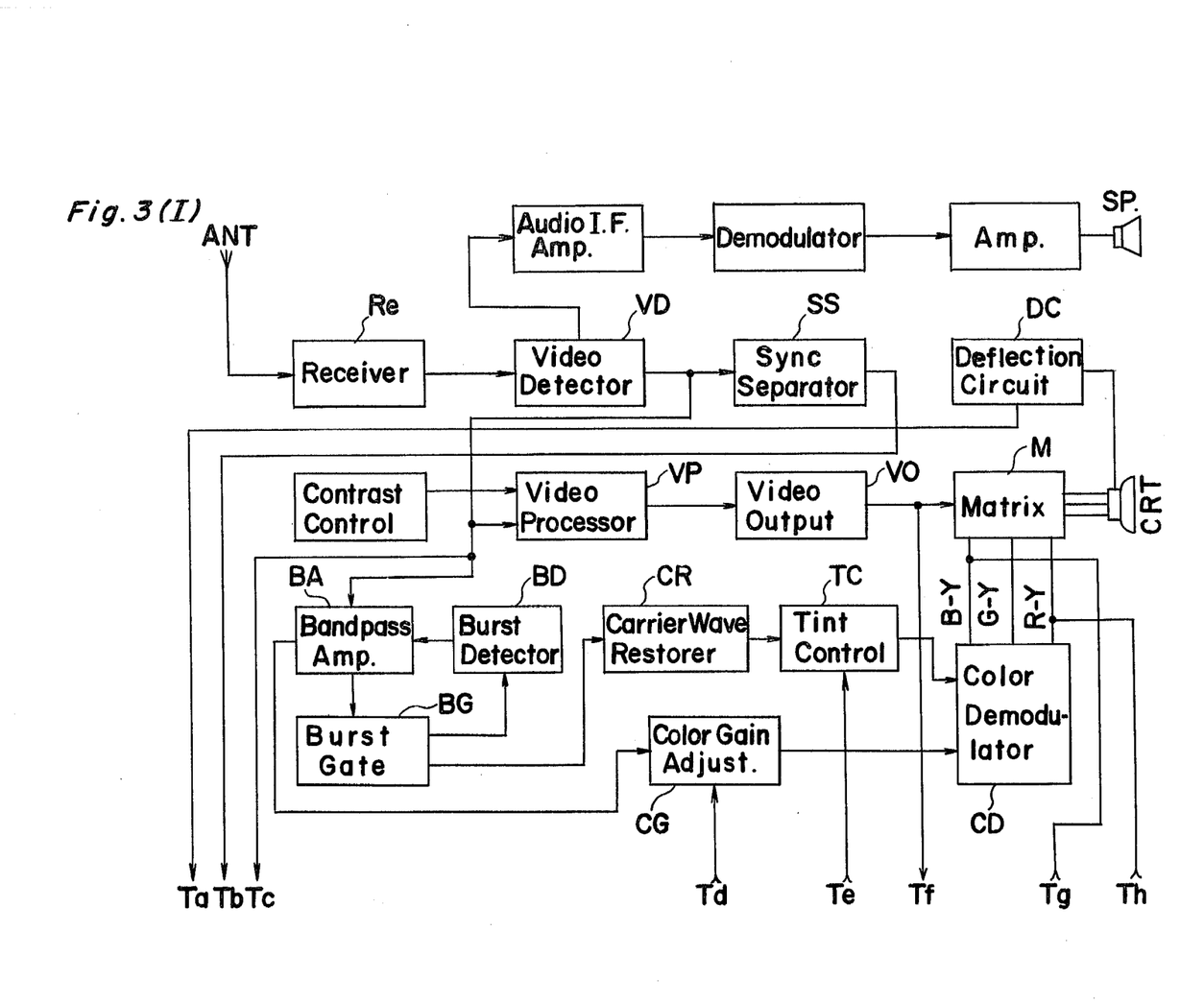

Referring now to FIG. 3, there is shown a circuit block diagram of a color television receiver set. As is well understood by those skilled in the art, a composite video and audio information intercepted by an antenna ANT is first fed to a receiver circuit Re which comprises the customary tunable front end, oscillator, mixer and one or more stages of intermediate frequency amplification. This receiver circuit Re applies an amplified composite video and audio information to a video detector VD from which both an audio signal and a composite video signal are issued, the audio signal being reproduced through a loud speaker SP after having been fed through an audio intermediate frequency amplifier, then an audio signal demodulator and finally an amplifier in a manner well known to those skilled in the art. The composite video signal issued from the receiver circuit Re is then applied to a sync separator SS on one hand and to both a video processor VP and a bandpass amplifier BA on the other hand. The composite video signal, which has been fed to the video processor VP is reproduced as a television picture through a cathode ray tube CRT after having been fed through a video output circuit VO and a color decoding matrix circuit M.

The bandpass amplifier BA, together with a burst detector BD and a burst gating circuit BG, forms a circuit for detecting a burst signal included in the composit video signal, which burst signal is then fed to a carrier wave restorer CR where the subcarrier wave is synchronized in phase with the burst signal as is well known to those skilled in the art. The phase-synchronized subcarrier wave emerging from the carrier wave restorer CR is fed through a tint control TC to a color demodulator CD from which B-Y, G-Y and R-Y color difference signals are generated to the matrix M on the strength of an output signal from a color gain adjusting circuit CG where a color information filtered from the composite video signal by the bandpass amplifier BA and subsequently fed thereto is adjusted in reference to a chrominance or chroma reference signal. The chroma reference signal is fed from an automatic color level control signal generating circuitry CLC which will be described later.

The sync separator SS separates a composite synchronizing signal from the composite video signal, which is in turn applied to a line sampling circuitry LSC as will be described later.

For effecting a tint adjustment by the utilization of a vertical interval reference (VIR) signal included in the transmitted television information as shown by a waveform (a) in FIG. 1, the details of the VIR signal being shown by a waveform (A) in FIG. 2, the tint control TC is adapted to be controlled by a tint control signal generated from a tint control signal generating circuitry TCS in a manner as will be described later.

It is to be noted that most circuit components of the color television receiver set, particularly, those shown in FIG. 3, Part (I), are well known to those skilled in the art and, therefore, the details thereof are herein omitted for the sake of brevity.

Referring particularly to FIG. 3, Part (II), the details of each of the line sampling circuitry LSC, automatic color level control signal generating circuitry CLC and a VIR chroma gate pulse and VIR killer signal generating circuitry KPG, which are advantageously employed in combination with the tint control signal generating circuitry TCS to which the present invention pertains, are disclosed in the copending applications, respectively, assigned to the same assignee of the present invention and, therefore, each of these circuitries LSC, CLC and KPG will now be described in terms of its function.

As shown, the line sampling circuitry LSC is constituted by a vertical pulse gating circuit VP, a gating circuit GC, a flyback pulse gating circuit FP, a vertical pulse gate decoder GD, a 5-bit binary counter BC, a reset decoder RD and a VIR pulse decoder PD and is so designed as to generate vertical synchronizing pulses, the waveform of which is shown by (c) in FIG. 1, at an output terminal T1, and respective pulses indicative of the presence of the VIR signal at its other output terminals T2 and T3, said pulses appearing at the respective terminals T2 and T3 being opposed in phase to each other. The vertical sync pulses are in negative polarity and are sampled from the composite sync signal fed to said line sampling circuitry LSC from the sync separator SS, while the VIR indicative pulses appearing at the respective terminals T2 and T3 are each synchronized with the VIR signal included in the transmitted television information in respect of its duration and the time at which it is generated, the waveform of the positive polarity VIR indicative pulse being shown by (c) in FIG. 2.

The VIR chroma gate pulse and VIR killer signal generating circuitry KPG is constituted by a VIR chroma gate pulse generator GP, a D.C. restorer DCR, a VIR killer pulse generator KP, a VIR killer detector KD and a killer output circuit KO. This VIR chroma gate pulse and VIR killer signal generating circuitry KPG is so designed as to generate a pulse, equal in duration to the duration of the chroma reference component of the VIR signal, at an output terminal T4 and a killer output signal at an output terminal T6, said killer output signal being generated so long as the television receiver set is intercepting the transmitted television information containing the VIR signal.

More specifically, the video signal from the video detector VD is applied to the DC restorer DCR where DC components of the VIR signal included in the video signal so applied are sampled. These sampled DC components of the VIR signal are processed at the VIR chroma gate pulse generator GP with the VIR indicative pulse fed from the line sampling circuitry LSC to provide the pulse indicative of the chroma reference component of the VIR signal at the terminal T4 which is in turn applied to the tint control signal generating circuitry TCS and to the automatic color level control signal generating circuitry CLC.

On the other hand, the output from the DC restorer DCR is also applied to the VIR killer pulse generator KP which generates a killer pulse to the VIR killer detector in response to excess of the level of the sampled DC components of the VIR signal over a predetermined value due to the presence of the VIR signal. The VIR killer detector KD upon receipt of the killer pulse from the VIR killer pulse generator KP generates a killer output signal indicative of the presence of the VIR signal in the transmitted television information, with which the killer output circuit is energized to generate the killer output signal to the output terminal T6 on one hand to energize an VIR indicator VI, which may be constituted by a light emissive diode, to show visually that the transmitted television information being intercepted by the television receiver set includes the VIR signal. It is to be noted that, in the absence of the VIR signal in the transmitted television information, the killer detector KD does not generate the killer output signal to the killer output circuit K0 and, therefore, no output signal is applied from the killer output circuit K0 to the terminal T6 and the VIR indicator VI.

The automatic color level control signal generating circuitry CLC comprises a zero chroma clamping circuit CCC for clamping a DC component of the B-Y color difference signal and a pedestal clamping circuit PC for clamping the pedestal level of the video signal. The level of the B-Y color difference signal and that of the pedestal portion of the video signal, respectively clamped by the clamping circuits CCC and PC, are applied to a comparator MC where they are compared with each other in a period for the chroma reference component of the VIR signal. If the difference exists therebetween, an output signal indicative of such difference is stored in a store circuit STC which is in turn fed through a VIR killer switch KSW to the color gain adjusting circuit CG to control the video signal in accordance with the chroma reference component of the VIR signal.

The tint control signal generating circuitry TCS comprises a zero chroma clamping circuit CC, a zero level comparator LC, a store circuit SC and a VIR killer switch SW and is so designed as to detect a difference between the outputs generated in a period for the vertical sync pulse and in a period for the chroma reference component of the VIR signal from the R-Y demodulator CD, and also to generate the tint control signal necessary to correct the phase difference between the carrier wave and the chrominance information in accordance with the difference so detected, as will be described in detail later.

As is well known to those skilled in the art, the demodulation axes in the color demodulator CD are at different angles with respect to one another and also with respect to that of the color burst component. In particular, the R-Y demodulation axis is in quadrature with the burst component while the B-Y demodulation axis is at 180° or minus phase, that is, shifted 90° in phase from the R-Y demodulation axis. The chroma reference component of the VIR signal is the same in phase with the B-Y color difference signal and in frequency with the burst component. Accordingly, the demodulation of the VIR signal will produce an output signal at the B-Y and G-Y demodulator outputs, but no signal at the R-Y demodulator output if and only if the burst component is at the proper zero phase reference. If the R-Y and B-Y demodulator axes are shifted 90° with respect to each other and the chroma reference component of the VIR signal coincides with the B-Y demodulation axis, then an appropriate signal will be generated at the R-Y demodulator output since the required quadrature relation no longer exist, which appropriate signal, that is, an R-Y demodulator output signal, is utilized to produce the tint control signal.

The details of the tint control signal generating circuitry TCS will be described with particular reference to FIGS. 5 and 6 which respectively show preferred embodiments of the present invention. However, for better understanding of the present invention, the details of the vertical pulse gating circuit VP, forming a part of the line sampling circuitry LSC and from which the vertical synchronizing pulses of positive polarity are applied to the tint control signal generating circuitry TCS, will first be described with reference to FIG. 4.

Figure 4:
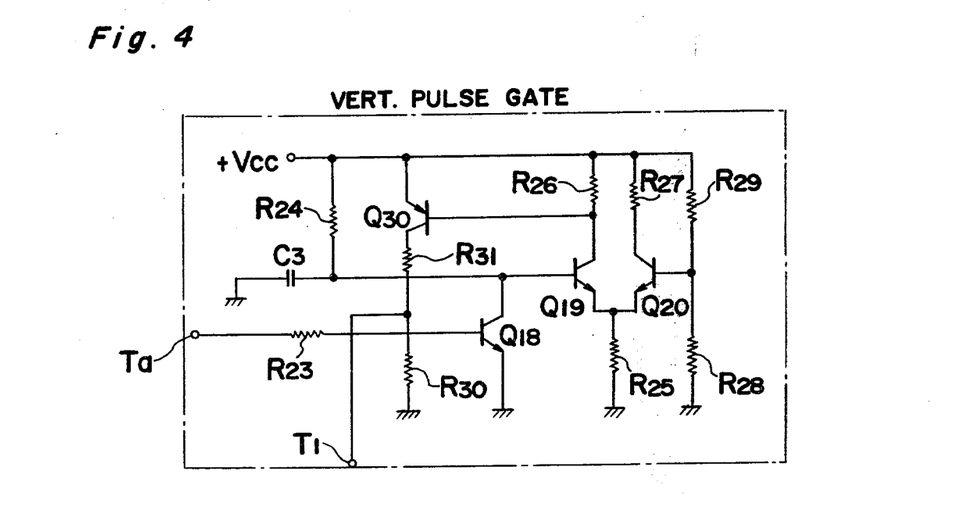
FIG. 4 is a circuit diagram showing a vertical pulse gating circuit employed in association with the tint control signal generator of the present invention.

Referring now to FIG. 4, the composite synchronizing signal of negative polarity, the waveform of which is shown by (b) in FIG. 1, is applied from the sync separator SS to the vertical pulse gating circuit VP through an input terminal Ta. The vertical pulse gating circuit VP comprises a switching transistor $Q_{18}$ which is triggered off during the duration of any one of the horizontal synchronizing pulse, vertical synchronizing pulse and equalizing pulse. Accordingly, during the duration of any one of the horizontal synchronizing pulse, vertical synchronizing pulse and equalizing pulse, a voltage from a source +Vcc thereof is charged on a capacitor $C_3$ through a resistor $R_{24}$. However, since the vertical synchronizing pulse, the horizontal synchronizing pulse and the equalizing pulse have different pulse widths, gradually decreasing in the order given above, the rate of increase of voltage charged on the capacitor $C_3$ is the highest when the vertical synchronizing pulse is applied to the base of the transistor $Q_{18}$ than when any one of the horizontal synchronizing pulse and the equalizing pulse is applied thereto. Therefore, if the base potential, expressed by (Resistance $R_{28}$/Resistances $R_{28}+R_{29}\times$Voltage Vcc), of a transistor $Q_{20}$, which forms a part of a differential amplifier together with a transistor $Q_{19}$, is selected to be lower than the potential applied to the base of the transistor $Q_{19}$ during the duration of the vertical synchronizing pulse, but higher than the potential applied to the base of the same transistor $Q_{19}$ during the duration of any one of the horizontal synchronizing pulse and the equalizing pulse, the transistor $Q_{19}$ can be brought into a conducting state only during the duration of the vertical synchronizing pulse and, therefore, the vertical synchronizing pulse can be outputted from the collector of a PNP type switching transistor $Q_{30}$ which is in turn applied through the output terminal T1 to the tint control signal generating circuitry TCS.

Figure 5:
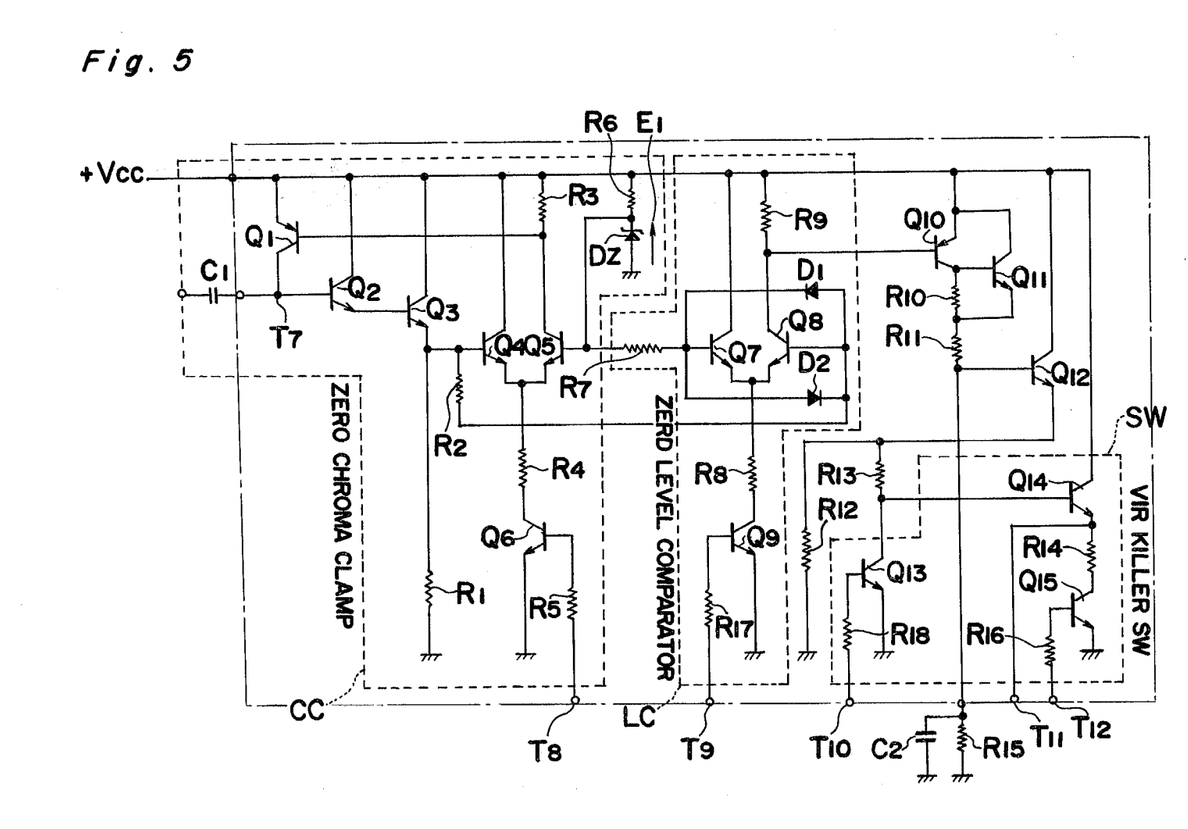
FIG. 5 is a detailed circuit diagram of the tint control signal generator according to one preferred embodiment of the present invention.

Referring to FIG. 5, the tint control signal generating circuitry TCS shown is assembled into an integrated circuit with or without some or all of the components of any one of the line sampling circuit LSC, the VIR chroma gate pulse and VIR killer signal generating circuitry KPG and the automatic color level control signal generating circuitry CLC. However, all of the components of the tint control signal generating circuitry TCS so far illustrates is assumed to be assembled into an integrated circuit as encircled by the chain line and, therefore, have various connection terminals such as designated by T7, T8, T9, T10, T11 and T12.

The connection terminal T7 is connected through a capacitor $C_1$ to the R-Y output of the color demodulator CD. The R-Y demodulator output signal, which has been fed to the terminal T7 through the capacitor $C_1$, is supplied to the base of a first transistor $Q_4$ through an emitter-follower amplifier constituted by transistors $Q_2$ and $Q_3$, the transistor $Q_4$ constituting a differential amplifier together with a second transistor $Q_5$. The second transistor $Q_5$ of the differential amplifier has a base connected to a Zener diode Dz so that the base potential can be kept at a predetermined voltage $E_1$, and a collector connected in shunt to the voltage source +Vcc through a resistor $R_3$ and to the base of a PNP type transistor $Q_1$ having a collector-emitter path connected between a positive bus line leading to the voltage source +Vcc and the base of the transistor $Q_2$. A transistor $Q_6$, employed to provide a constant current to the differential amplifier constituted by the transistors $Q_4$ and $Q_5$, has a base connected to the vertical pulse gating circuit VP through the terminals T8 and T1 so that the transistor $Q_6$ can be switched on during the duration of each of the vertical synchronizing pulse.

It is to be noted that the circuit component including the transistors $Q_1$ to $Q_6$ constitutes the zero chroma clamping circuit CC described with reference to FIG. 3.

In the construction so far described, when the voltage of the R-Y demodulator output signal applied to the base of the transistor $Q_4$ through the terminal T7 by way of the capacitor $C_1$ is lower than the voltage $E_1$ at the time the transistor $Q_6$ conducts in response to the vertical synchronizing pulse applied thereto through the terminal T8, the second transistor $Q_5$ starts conducting with the consequent reduction in collector potential. Upon conduction of the second transistor $Q_5$ to bring the transistor $Q_1$ into a conductive state so that the base potential of the transistor $Q_4$ can be increased through the emitter-follower amplifier ($Q_2$ and $Q_3$) to a value substantially equal to the voltage $E_1$. Simultaneously with the conduction of the transistor $Q_1$, the capacitor $C_1$ is charged to such a voltage that the base potential of the transistor $Q_4$ and the base potential of the transistor $Q_5$ become equal to each other, the charged voltage on the capacitor $C_1$ being stored until the VIR signal occurs on the 19th line of the televised image.

The zero level comparator LC of the tint control signal generating circuitry TSC for comparing the voltage of the demodulated chroma reference component of the VIR signal fed from the R-Y demodulator output of the color demodulator CD with the voltage charged on the capacitor $C_1$ comprises a third transistor $Q_7$, having its base connected of the Zener diode Dz which determines the voltage $E_1$, a fourth transistor $Q_8$, which forms another differential amplifier together with said third transistor $Q_7$ and which has its base connected to the base of the first transistor $Q_4$ so that the R-Y demodulation output signal can be applied to said base of the transistor $Q_8$, and a transistor $Q_9$ for providing a constant current to the differential amplifier constituted by the third and fourth transistors $Q_7$ and $Q_8$. It is to be noted that an output from the differential amplifier constituted by the transistors $Q_7$ and $Q_8$ emerges from the collector of the fourth transistor $Q_8$.

The zero level comparator LC further comprises a series-connected limiter diodes $D_1$ and $D_2$, the junction between the cathode of the diode $D_1$ and the anode of the diode $D_2$ and the junction between the anode of the diode $D_1$ and the cathode of the diode $D_2$ being respectively connected to the base of the transistor $Q_7$ and the base of the transistor $Q_8$ as shown.

The store circuit SC comprises a RC circuit constituted by parallel-connected capacitor $C_2$ and resistor $R_{15}$.

Figure 2:
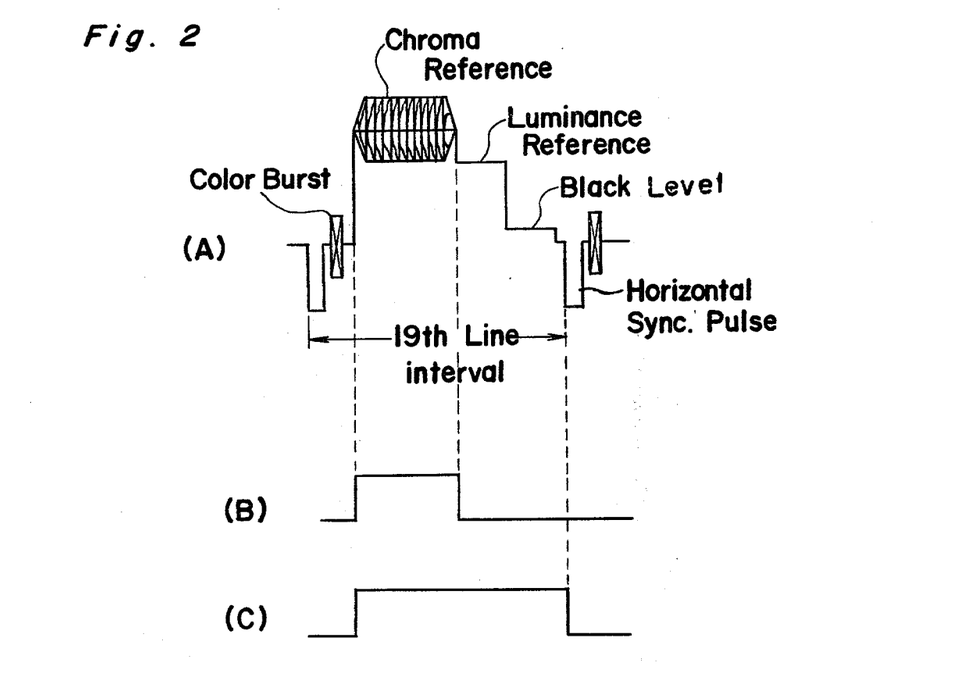
FIG. 2 is a diagram showing waveform of the VIR signal and related pulses.

It is to be noted that, at the time the chroma reference component of the VIR signal included in the R-Y demodulator output signal is applied to the capacitor $C_1$ while the latter stores the voltage clamped in a period for the vertical sync pulse in the manner as hereinbefore described, the chroma gate pulse of the waveform shown by (B) in FIG. 2 is supplied to the base of the transistor $Q_9$ through the terminal T9 to operate the differential amplifier in the comparator LC. However, under a proper condition in which the R-Y demodulation axis and the chroma reference component are in quadrature with each other, the R-Y demodulator output is identical with the R-Y demodulator output during the vertical sync pulse interval and, therefore, the base voltage of the transistor $Q_8$ is equal to the voltage $E_1$. On the contrary thereto, if the R-Y demodulation axis and the chroma reference component are not in quadrature with each other, the appropriate signal will be produced at the R-Y demodulator output. Under this condition, an additional voltage delivered from the R-Y demodulator output signal is charged on the capacitor $C_1$ while the latter has previously been charged to a predetermined voltage during the vertical synchronizing period as hereinbefore described, and accordingly the potential at the base of the transistor $Q_4$ and then that of the transistor $Q_8$ are sequentially increased or decreased. Upon increase or decrease of the base potential of the transistor $Q_8$ over or below the voltage $E_1$, the transistor $Q_8$ conducts more deeply or more shallowly to generate an output signal from the collector thereof which is in turn stored in the store circuit SC for a predetermined period of time equal to one line horizontal scanning period.

Although in the foregoing description the base potential of the transistor $Q_8$ has been described as equal to the voltage $E_1$ when no phase displacement occur between the chroma reference component of the VIR signal and the R-Y demodulator axis, it is to be noted that, in practice, because of the presence of a resistor $R_2$ inserted between the bases of the respective transistors $Q_4$ and $Q_8$, the voltage at the base of the transistor $Q_8$ will be of a value $E_2$ slightly lower than the voltage $E_1$ determined by the Zener diode $D_z$. Similarly, because of the presence of a resistor $R_7$ inserted between the bases of the respective transistors $Q_5$ and $Q_7$ as shown, the base potential of the transistor $Q_7$ is of a value $E_2$ slightly lower than the voltage $E_1$. Accordingly, when the base potential of the transistor $Q_8$ increases to a value higher than the voltage $E_2$ incident of the phase displacement between the chroma reference component of the VIR signal and the R-Y demodulation axis, the collector potential of the transistor $Q_8$ is lowered, the consequence of which is that transistors $Q_{10}$ and $Q_{11}$ are operated to conduct more deeply to allow the capacitor $C_2$ to be charged on one hand and to allow a transistor $Q_{12}$ to conduct more deeply. Upon the conduction of the transistor $Q_{12}$, the conductivity of a transistor $Q_{14}$ forming a part of the VIR killer switch SW as shown in FIG. 3, Part (II), is changed to allow the tint control signal to be fed through the terminal T11 to the tint control TC which is constituted by an automatic phase control of a construction well known to those skilled in the art.

It is to be noted that, in addition to the transistor $Q_{14}$, the VIR killer switch SW includes parallel-connected transistors $Q_{13}$ and $Q_{15}$, both of which are utilized to cancel the generation of the tint control signal from the tint control signal generating circuitry TCS during the absence of the VIR signal in the transmitted television information intercepted by the television receiver set. More specifically, when the transmitted television information does not contain VIR signal, the transistors $Q_{13}$ and $Q_{15}$ are respectively switched on and off. In order to achieve this, the trigger pulse from the killer output circuit KO may be applied in part to the base of the transistor $Q_{13}$ in the form of a high level pulse and in part to the base of the transistor $Q_{15}$ in the form of a low level pulse and, for this purpose, two alternatives can be employed, one being to construct the killer output circuit so as to generate the high and low level pulses and the other being to employ an inverter on a circuit between the terminal T6 and the terminal T12 if the trigger pulse from the killer output circuit KO is only the high level pulse.

It is to be noted that, as can readily be understood to those skilled in the art, the transistor $Q_{15}$ may not be always necessary and, therefore, may be omitted together with terminal T12 and resistors $R_{14}$ and $R_{16}$.

While the tint control signal generating circuitry TCS according to the embodiment shown in FIG. 5 is so designed as to supply the tint control signal to the tint control TC when displacement in phase between the chroma reference component and the B-Y demodulation axis occurs, the tint control, signal generating circuitry TCS may have a manual tint control for providing a capability of manual tint adjustment. This tint control signal generating circuitry TCS having the manual tint control is illustrated in FIG. 6, reference to which will now be made.

Figure 6:
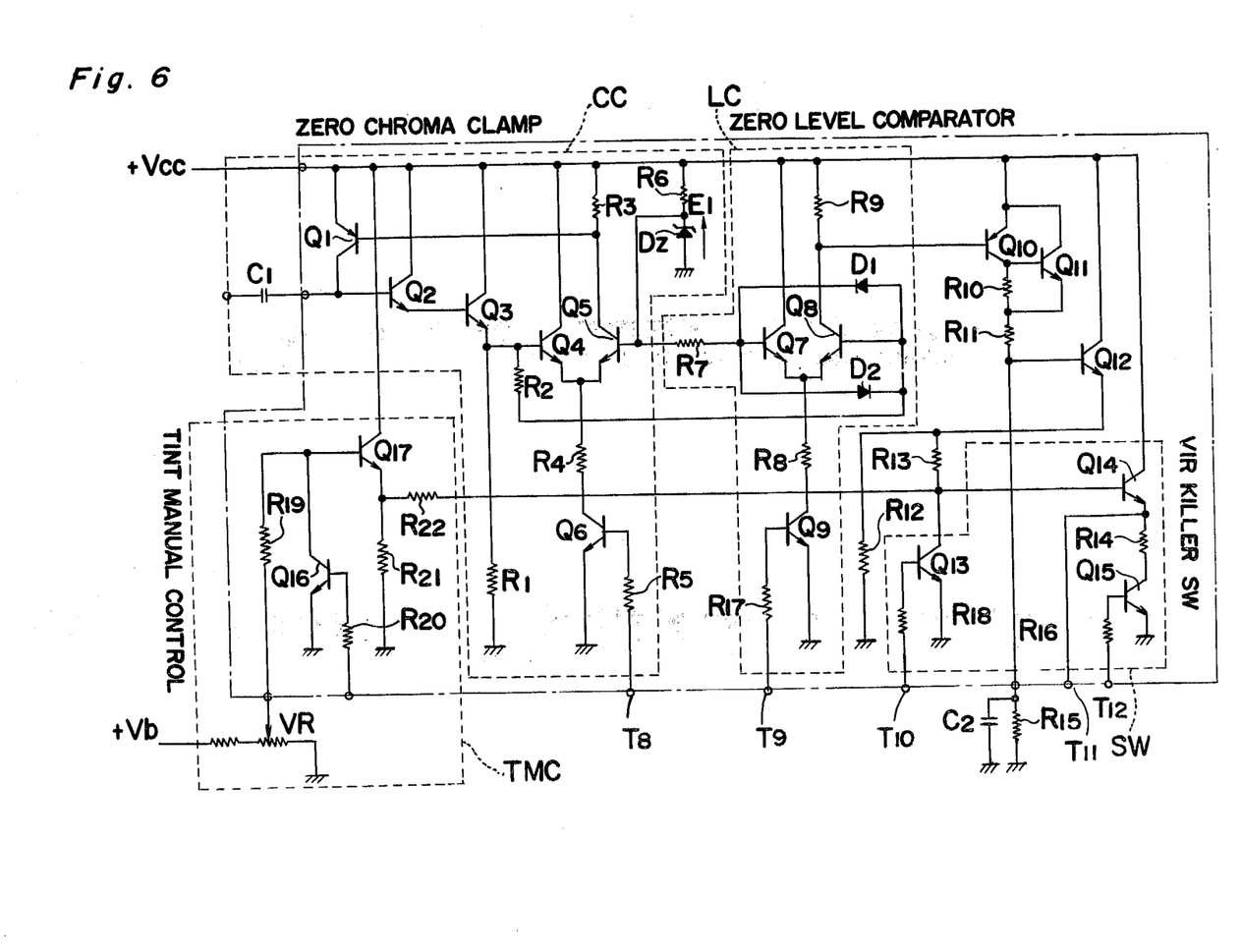
FIG. 6 is a diagram similar to FIG. 5, showing another preferred embodiment of the present invention.

Referring now to FIG. 6, the tint manual control TMC comprises a transistor $Q_{17}$ having its collector connected to the positive bus line leading to the voltage source +Vcc, its emitter connected in shunt to the base of the transistor $Q_{14}$ through a resistor $R_{22}$ and to the ground through a resistor $R_{21}$, and its base connected to a manually movable tap of a variable resistor VR. The tint manual control TMC further comprises a transistor $Q_{16}$ having its base connected to the base of the transistor $Q_{17}$, its emitter connected to the ground and its base connected through a resistor $R_{20}$ to a terminal T13 which is in turn connected to the VIR chroma gating pulse generator GP by way of the terminal T4.

With the tint manual control TMC so constructed as hereinbefore described, the VIR gate pulse of the VIR signal generated from the VIR pulse decoder PD through the terminal T2, the waveform of which is shown by (C) in FIG. 2, is applied to the base of the transistor $Q_{16}$ by way of the terminal T13. Accordingly, during the absence of the VIR signal, the transistor $Q_{16}$ is in a non-conductive state and, consequently, the voltage determined by the setting of the variable resistor VR is applied to the base of the transistor $Q_{14}$ through an emitter-follower amplifier ($Q_{17}$) and the resistor $R_{22}$. In view of the above fact, by adjusting the resistance of the variable resistor VR, the voltage level of the tint control signal to be applied to the tint control TC can be slightly varied.

However, during the presence of the VIR signal, since the transistor $Q_{16}$ is switched on, no voltage across the variable resistor is applied to the base of the emitter-follower amplifier ($Q_{17}$) and, therefore, the tint control signal output from the differential amplifier constituted by the transistors $Q_7$ and $Q_8$ is not subjected to any alternation.

In any one of the foregoing embodiments shown in FIGS. 5 and 6, the store circuit SC has been described as constituted by the capacitor $C_2$ and the resistor $R_{15}$. As shown in any one of FIGS. 5 and 6, the resistor $R_{15}$ has one end grounded and the other end connected to the emitter of the transistor $Q_{10}$. In this arrangement, the circuit including the capacitor $C_2$ and the resistor $R_{15}$ has a relatively large time constant such that a relatively long period of time is required for the capacitor $C_2$ to complete discharge of voltage stored on the capacitor $C_2$. This is because, since the VIR signal appears every field of the television information, the capacitor $C_2$ must have a relatively large capacitance sufficient to store voltage for a period of time at least equal to the one field period. In addition, the time constant required for the capacitor $C_2$ to be charged with voltage is relatively large and the time required for the capacitor $C_2$ to complete charging of voltage is therefore relatively large. Because of the prolonged time required for the capacitor $C_2$ to complete charging of voltage, this arrangement involves a drawback in that it constitutes another cause for distortion in hue and saturation in the reproduced picture. The reason for the relatively large charging time constant is that, when the transistor $Q_{10}$ is switched on in response to the application of the voltage to the base thereof to allow the emitter current to be charged on the capacitor $C_2$, the emitter impedance of the transistor $Q_{10}$ imposes a restriction on the current capacitance. In addition, the reason for the prolonged time required for the capacitor $C_2$ to complete charging of voltage shortly after the channel selector has been changed from a channel, in which no VIR signal is included in the transmitted television information, over to another channel in which the VIR signal is included in the transmitted television information is that, while the VIR signal is carried on the particular line during each vertical blanking interval, the time required for the transistor $Q_{10}$ to supply the current to be charged on the capacitor $C_2$ is relatively long.

However, the above described drawback can be advantageously eliminated by the employment of a switching means operable to connect the end of the capacitor $C_2$ opposed to the grounded end thereof to the ground through the resistor $R_{15}$ when the television receiver set is being intercepting the VIR signal containing television information, but to apply a predetermined bias voltage to said one end of the capacitor $C_2$ through the resistor $R_{15}$ when the television receiver set is not in position to intercept the VIR signal containing television information. One type of this switching means is illustrated in FIG. 7, reference to which will now be made.

Figure 7:
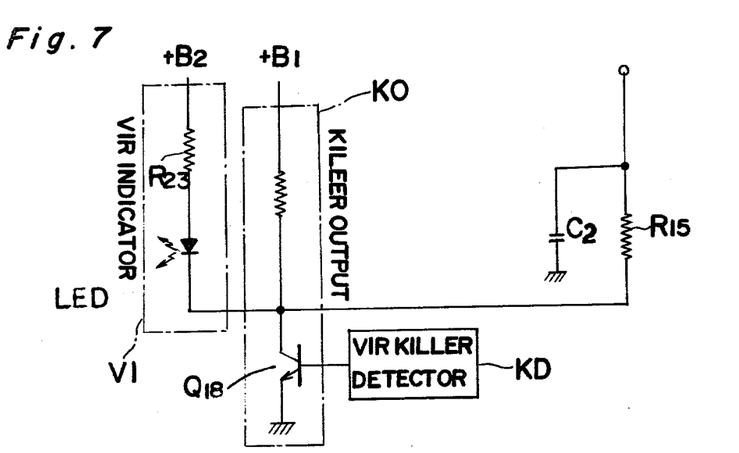
FIG. 7 is a detailed circuit diagram of a switching circuit employable in any one of the circuitries respectively shown in FIGS. 5 and 6.

Referring to FIG. 7, the VIR indicator VI is shown to comprises series-connected resistor $R_{23}$ and photo emissive diode LED, said diode LED emitting light, when the television receiver set is in position to intercept the VIR signal containing television information as hereinbefore described, in response to the trigger pulse supplied from the killer output circuit KO. Since the killer detector KD is so designed as to generate a high level signal so long as the television receiver set is set to intercept the VIR signal containing television information, this high level signal from the VIR killer detector KD is applied to a base of a transistor $Q_{18}$, forming a part of the killer output circuit KO, to trigger the transistor $Q_{18}$ on. Upon conduction of the transistor $Q_{18}$ effected in the manner as hereinabove described, the collector potential of the transistor $Q_{18}$ becomes equal to the ground potential and, accordingly, the light emissive diode LED connected to the collector of the transistor $Q_{18}$ is energized to emit light. However, when the television receiver set is not in position to intercept the VIR signal containing television information, the killer detector KD generates a low level signal to the base of the transistor $Q_{18}$ and, accordingly, the transistor $Q_{18}$ is held in a non-conductive state. Under this condition, the collector potential of the transistor $Q_{18}$ of equal to a bias voltage $+B_1$.

As stated above, the collector potential of the transistor $Q_{18}$ is equal to the ground potential during the presence of the high level signal from the VIR killer detector KD, but maintain a predetermined voltage during the presence of the low level signal from the VIR killer detector KD. Therefore, only by connecting the end of the resistor $R_{15}$, which has been described and shown as grounded in any one of FIGS. 5 and 6, to the collector of the transistor $Q_{18}$, the latter can be used cocurrently as the switching means referred to above.

The arrangement shown in FIG. 7 is advantageous in that, even when the television receiver set is switched to a channel through which the VIR signal containing television information is broadcasted, the tint control signal can readily be generated to the tint control TC with no substantial distortion occurring in hue and saturation.

It is to be noted that, if the direct current components of the demodulator output applied during the vertical synchronizing interval contain a noise component, this demodulator output is inaccurate due to the presence of the noise as is well known to those skilled in the art. Accordingly, if the color gain of the color signal supplied to the color demodulator during the vertical synchronizing interval is suppressed so that no noise component is apparent such as shown by the waveform (d) in FIG. 1, the demodulator output will becom accurate and, therefore, the tint control signal generated from the tint control signal generating circuitry TCS according to the present invention becomes accurate. In order to achieve this, it is preferred to construct the VIR killer switch KSW of the automatic color level control signal generating circuitry CLC in a manner as shown in FIG. 8.

Figure 8:
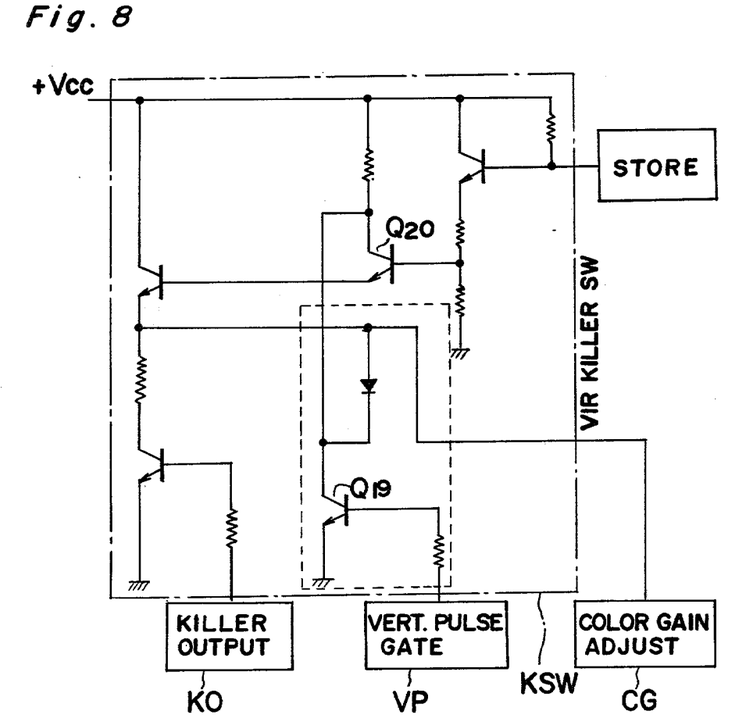
FIG. 8 is a detailed circuit diagram of a VIR killer switching circuit having an automatic gain suppressing circuit incorporated therein, said VIR killer switching circuit being employable in association with the tint control signal generator according to any one of the embodiments of the present invention.

Referring now to FIG. 8, the VIR killer switch KSW comprises an automatic color gain suppressing circuit including a transistor $Q_{19}$, having its base connected to the vertical pulse gating circuit VP and, therefore, adapted to be switched on in response to the vertical synchronizing pulses, and a diode D connected to the collector of the transistor $Q_{19}$. This automatic color gain suppressing circuit is inserted between a transistor $Q_{20}$ and the terminal T1 with the collector of said transistor $Q_{20}$ connected to the collector of the transistor $Q_{19}$. In this construction, it will readily be seen that, when the transistor $Q_{19}$ is switched on in response to the vertical synchronizing pulses, the collector potential of the transistor $Q_{20}$ is grounded so that the color signal to be applied to the color gain adjusting circuit CG can be suppressed to a zero volt.

Although the present invention has fully been described in connection with the preferred embodiments thereof with reference to the accompanying drawings, it is to be noted that various changes and modifications are apparent to those skilled in the art. By way of the example, the concept of the present invention can equally be applicable not only to the NTSC television system, but also to any other television system including PAL and SECAM systems.

Accordingly, such changes and modifications are to be understood as included within the true scope of the present invention unless they depart therefrom.

What is claimed is:

1. A tint control signal generator for a color television receiver set comprising means for demodulating color television signals including sync pulse information, luminance information, suppressed subcarrier chrominance information, color burst information and a VIR information, said VIR information containing chrominance reference, luminance reference and black level reference components and occurring on a predetermined line during the vertical retrace interval, and a tint control means connected in series with and forming a front stage preceding said demodulating means, said tint control signal generator comprising:
   means for clamping an appropriate output of the demodulating means to give a direct current component by the utilization of the vertical synchronizing pulses during the vertical retrace interval;
   a source of a pulse having a pulse width equal to the duration of the chroma reference component of the VIR signal; and,
   means operable by said pulse for comparing the level of the appropriate output of the demodulating means, generated during the duration of the chroma reference component of the VIR signal, with the level of the direct current component and for generating a tint control signal to the tint control if any difference exists between the first and second mentioned levels.

2. A tint control signal generator as claimed in claim 1, wherein said appropriate output of the demodulating means is an output generated from the R-Y output terminal of said demodulating means, said chroma reference component of the VIR information being synchronized in phase with said R-Y output.

3. A tint control signal generator as claimed in claim 1, further comprising a storing means for storing the output signal from said comparing means for a predetermined period of time equal to or longer than one field scanning period.

4. A tint control signal generator as claimed in claim 3, wherein said storing means includes a capacitance element and a resistance element connected in parallel to said capacitance element.

5. A tint control signal generator as claimed in claim 4, further comprising a switching means for connecting one end of said resistance element opposed to the junction between said capacitance element and said resistance element to a source of a predetermined bias voltage so long as the television receiver set is set in position to reproduce the television information containing the VIR information and for connecting said one end of said resistance element to the ground potential so long as the television receiver set is set in position to reproduce the television information containing no VIR information.

6. A tint control signal generator as claimed in claim 5, further comprising an indicator means including a photo emissive diode for emitting light, only during a period during which the television receiver set is set to reproduce the television information containing the VIR information, said switching means being concurrently constituted by said indicator means.

7. A tint control signal generator as claimed in claim 1, wherin said clamping means comprises a differential amplifier constituted by first and second transistors, said appropriate output of the demodulating means being applied to a control electrode of said first transistor through a capacitance element while a constant reference voltage is applied to a control electrode of said second transistor, means for feeding an output from said second transistor back to the control electrode of said first transistor, and a constant current transistor adapted to be switched on in response to the vertical synchronizing pulses to operate said differential amplifier during the duration of each of the vertical synchronizing pulses.

8. A tint control signal generator as claimed in claim 7, wherein said comparing means comprises a differential amplifier constituted by third and fourth transistors, said constant reference voltage being also applied to a control electrode of said third transistor, said appropriate output of the demodulating means being also applied to a control electrode of said fourth transistor, and a constant current transistor adapted to receive a gating pulse of a duration sufficiently covering the chroma reference component interval of the VIR information, the output from said comparing means emerging from an output electrode of either one of said third and fourth transistor.

* * * * *